United States Patent
Imgrund et al.

(10) Patent No.: US 12,443,726 B2
(45) Date of Patent: Oct. 14, 2025

(54) MEASURING CONFOUNDING EFFECTS IN MACHINE LEARNING-BASED VULNERABILITY DISCOVERY

(71) Applicant: SAP SE, Walldorf (DE)

(72) Inventors: Erik Imgrund, Heidelberg (DE); Tom Ganz, Karlsruhe (DE); Martin Haerterich, Walldorf (DE)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 18/522,389

(22) Filed: Nov. 29, 2023

(65) Prior Publication Data
US 2025/0173442 A1    May 29, 2025

(51) Int. Cl.
*G06N 7/01* (2023.01)
*G06F 21/57* (2013.01)
*G06N 20/00* (2019.01)

(52) U.S. Cl.
CPC ............. *G06F 21/577* (2013.01); *G06N 7/01* (2023.01); *G06N 20/00* (2019.01); *G06F 2221/033* (2013.01)

(58) Field of Classification Search
None
See application file for complete search history.

(56) References Cited

U.S. PATENT DOCUMENTS

2024/0028740 A1* 1/2024 Chan ................. G06F 21/577
2024/0419917 A1* 12/2024 Clement ............. G06N 3/045

* cited by examiner

*Primary Examiner* — Cai Y Chen
(74) *Attorney, Agent, or Firm* — Buckley, Maschoff & Talwalkar LLC (57) ABSTRACT

A system and method include reception of a plurality of code samples and corresponding ground truth classifications, generation, for each of the plurality code samples, of a plurality of perturbed code samples, generation of first probabilities for each of the plurality of code samples and the perturbed code samples using a first classification model, generation of second probabilities for each of the plurality of code samples and the perturbed code samples using a second model, determination of a causal probability for each code sample based on the first probabilities and the second probabilities, determination of a causal performance metric of the first classification model based on the ground truth classifications and the causal probabilities, and presentation of the causal performance metric.

20 Claims, 6 Drawing Sheets

| CODE SAMPLE | GROUND TRUTH | UNADJUSTED PREDICTION | CAUSAL PREDICTION |
|---|---|---|---|
| $x_0$ | 1 | 1 | 0 |
| $x_1$ | 1 | 1 | 1 |
| $x_2$ | 0 | 1 | 1 |
| $x_3$ | 0 | 0 | 0 |

*FIG. 4*

Confounding Effects — 500

Test Model ID: ~~~~~~  Evaluation Dataset: 510

Ref. Model ID: ~~~~~

Select Performance Metric: 520

[Balanced Accuracy ▼]  [Go] 530

540
Unadjusted Performance..................75%
Causal Performance........................50%

Confounding Effect..........................-33%

MEASURING CONFOUNDING EFFECTS IN MACHINE LEARNING-BASED VULNERABILITY DISCOVERY

BACKGROUND

A software program consists of code, often organized into modules or procedures, which describes a sequence of desired corresponding computing operations. Most code is written in high-level programming languages and translated into processor-executable machine language using a compiler, an interpreter, or a combination of the two. A software program may consist of one or more files of code which, for example, may be independently compiled and then linked together into a single executable file.

The increased adoption of continuous integration (CI) and continuous deployment (CD) has exacerbated the need to monitor software programs for potential bugs and security risks, which will be referred to herein collectively as vulnerabilities. In particular, and to maintain a secure and reliable software development lifecycle, organizations desire robust software quality assurance processes for identifying and mitigating vulnerabilities in code prior to deployment within production systems.

The traditional approach to identifying vulnerabilities in code relies on manual code reviews and extensive testing. This approach is time-consuming, resource-intensive, and prone to human error. Static program analysis tools, on the other hand, allow developers and security professionals to identify potentially-flawed code without actually executing the code. Unfortunately, such tools often report false positive alerts, the resolution of which requires expensive manual triage.

Methods for learning-based vulnerability detection have been proposed to automatically derive code evaluation algorithms based on known-vulnerable and known-clean (i.e., not vulnerable) code. In particular, recent learning-based large transformer models have shown good performance with respect to various vulnerability detection and vulnerability localization benchmarks. These results are outweighed by a failure of the models to generalize to out-of-distribution samples and a tendency to locate irrelevant code when explaining detected vulnerabilities. Consequently, good performance is achievable only if the training data and test data come from the same software program on which the models are to be applied, clearly undermining the practical utility of learning-based vulnerability discovery.

DETAILED DESCRIPTION

The following description is provided to enable any person in the art to make and use the described embodiments. Various modifications, however, will be readily-apparent to those in the art.

The present inventors have identified spurious correlations (i.e., focuses on irrelevant artifacts) as a main obstacle to transferability and generalization of learning-based vulnerability discovery models. However, traditional model evaluation using test data and performance metrics does not expose these characteristics of a model. To address this shortcoming, embodiments provide a system for estimating the impact of spurious correlations on learning models using only a single set of test data (i.e., code samples) and different semantics-preserving code perturbations. It may be determined to replace or adapt excessively-biased models based on such estimations, even if traditional performance metrics indicate satisfactory performance. Tools implementing some embodiments may therefore be advantageously suited for incorporation into a CI/CD software development process.

Figure 1:
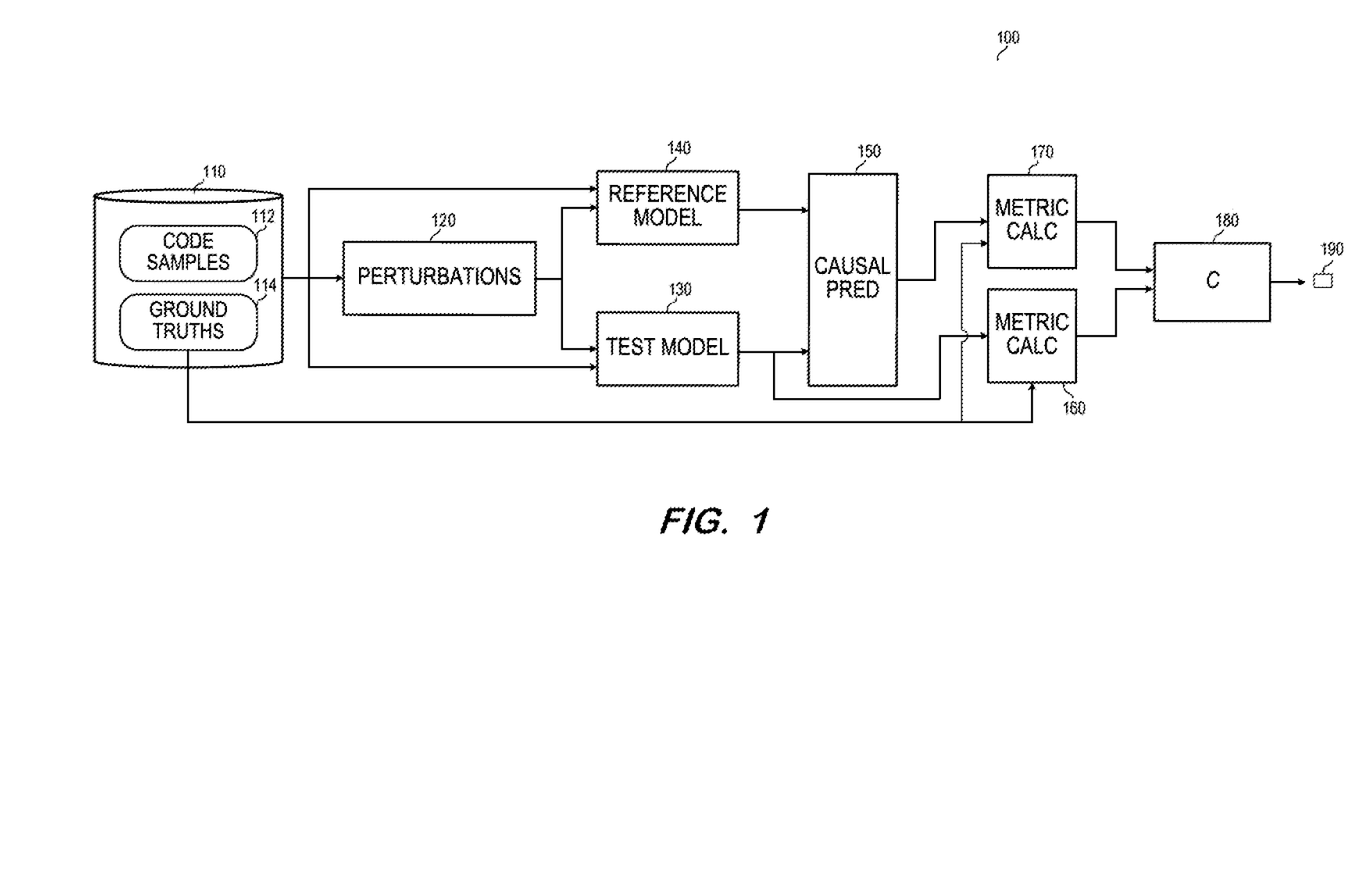
FIG. 1 illustrates a system to determine the estimated causal performance and confounding effect of a trained model according to some embodiments.

FIG. 1 illustrates system 100 according to some embodiments. Each of the illustrated components of system 100 may be implemented using any suitable combinations of computing hardware and/or software that are or become known. In some embodiments, two or more components of system 100 are implemented by a single computing device.

The components of system 100 may be located on-premise, cloud-based (e.g., in which computing resources are virtualized and allocated elastically), distributed (e.g., with distributed storage and/or compute nodes) and/or deployed in any other suitable manner. Each component may comprise disparate cloud-based services, a single computer server, a cluster of servers, and any other combination that is or becomes known. All or a part of each component may utilize Infrastructure-as-a-Service (IaaS), Platform-as-a-Service (PaaS) and/or Software-as-a-Service (SaaS) offerings owned and managed by one or more different entities as is known in the art.

System 100 may operate to determine the estimated causal performance and confounding effect of a trained model according to some embodiments. System 100 may be implemented within program code of any type or number of software programs. All or a portion of system 100 may be provided by a machine learning model training service, and/or a CD/CI administration program which receives a trained model from a training system and determines the estimated causal performance and confounding effect of the model before deploying it to evaluate pre-production code.

Storage 110 of system 100 may comprise any type or types of data storage systems that are or become known. Storage 110 may comprise a code repository which may provide collaboration, code review, versioning, pull requests, branching, project management, etc. as is known in the art. Storage 110 stores code samples 112 and corresponding ground truth classifications 114.

Each of code samples 112 may comprise any number of code statements or code lines, and may comprise a function, a module, an interface, a library, an application, etc. Code samples 112 may conform to any programming language that is or becomes known, including but not limited to JavaScript, C++, and ABAP. Code samples 112 may be received from any number of sources and may comprise portions of many different applications, libraries, services, etc. which provide related or unrelated functionalities.

Each ground truth classification 114 corresponds to one of code samples 112. A ground truth classification 114 may comprise a label indicating whether its corresponding code sample 112 is Vulnerable (i.e., includes a vulnerability) or Clean (i.e., does not include a vulnerability). The ground truth classification 114 corresponding to a code sample 112 may be determined manually or using any suitable means.

Perturbations component 120 applies perturbations to code samples 112 to generate perturbed code samples. A perturbation comprises a modification to a code sample which adds, removes, or changes code artifacts without changing the semantics of the code sample. Such artifacts originate from irrelevant features that cause a model to learn biased representations and are called confounders in causal learning.

Example sources of bias which can manifest as artifacts include coding style, control flow and naming. Every code sample exhibits an implicit coding style, and the coding style of code samples from one program will likely differ from the coding style of another program. Regarding control flow, programs use different calling hierarchies or indirections due to developer preference and underlying programming patterns such as, for instance, object-oriented design principles. Different code samples from different programs may also naturally vary in their naming conventions. If vulnerable code samples used to train a vulnerability discovery model are biased to a particular coding style, control flow, and/or naming, the particular coding style, control flow, and/or naming will likely correlate with the model output (i.e., classification), reducing the transferability and generalization of the model.

The application of different perturbations to the code should resemble a causal intervention. A non-confounded model should perform equally on semantically-equivalent but perturbed code since the model output should solely depend on the causal features of the code. Consequently, the application of different perturbations to a code sample provides insight into how a model behaves in view of different artifacts and may yield a more robust basis for model evaluation and comparison.

Perturbations component 120 may apply one or more sets of perturbations to a code sample 112, resulting in a different perturbed code sample for each set of perturbations. The perturbations may include, for example, styling, uglification, and obfuscation perturbations as will be described below. According to some embodiments, perturbations component 120 applies a given number of sets of one or more perturbations to each code sample 112 to generate the given number of perturbed code samples for each code sample 112.

Code samples 112 and the perturbed code samples are provided to test model 130 and to reference model 140. Test model 130 is a previously-trained model whose estimated causal performance and confounding effect are to be determined as described herein. Test model 130 has been trained to output a likelihood that a received code sample is vulnerable.

Test model 130 may comprise any suitable supervised machine learning model (e.g., neural network, logistic regression, decision tree, random forest, gradient-boosted tree, multilayer perceptron, one-vs-rest, Naive Bayes) that is or becomes known. Generally, test model 130 implements a parameterized classification function $f=f_\theta$, whose weights $\theta$ were previously optimized during training on a set of code samples labeled as Vulnerable or Clean. More formally, $f_\theta$ is a function that maps a code sample x and to the probability P(vulnerable|x) of it being vulnerable.

$$f_\theta: x \mapsto P(\text{vulnerable}|x).$$

Reference model 140 estimates the likelihood of each received code sample. Reference model 140 may comprise any probabilistic language model that is or becomes known. Probabilistic language models are language models that provide a probability distribution of the next token $t_{n+1}$ given the previous context $t_1, \ldots, t_n$: $P'(t_{n+1}|t_n, \ldots, t_1)$ and can therefore be used to estimate the likelihood of a complete text sample. According to some embodiments, reference model 140 is a generative Large Language Model with weights $\theta_r$. Reference model 140 may calculate the likelihood $P'_{\theta_r}$ of a code sample by calculating the likelihood of each token of the code sample dependent on the previous tokens. Since calculating the likelihood of the entire sequence by multiplying the individual token likelihoods is often numerically infeasible, log-likelihoods may be averaged over the entire code sample to obtain the approximate likelihood of the code sample.

Causal prediction component 150 receives the code sample probabilities determined by test model 130 and reference model 140. Causal prediction component 150 determines an estimated causal probability for each code sample 112 based on the received code sample probabilities. Determination of the estimated causal probabilities according to some embodiments will be described in detail below.

Metric calculation component 160 receives the probabilities of each code sample from test model 130 and the ground truth classifications 114 corresponding to each code sample. Component 160 determines a performance metric for test model 130 based on the received probabilities and the ground truth classifications 114. For example, component 160 may convert each probability to a classification and compare the converted classifications of each code sample to the ground truth classifications of each code sample to determine the performance metric.

Metric calculation component 170 receives the causal probabilities for each code sample from component 150 and the ground truth classifications 114 corresponding to each code sample. Component 170 determines a causal performance metric for test model 130 based on the received causal probabilities and the ground truth classifications 114. Component 170 may determine the causal performance metric by converting the causal probabilities of each code sample to a classification and comparing the classifications of each code sample to the ground truth classifications of each code sample.

Confounding effect determination component 180 determines confounding effect 190 based on the performance metric and the causal performance metric received from metric calculation components 170 and 180, respectively. Based on confounding effect 190 (and perhaps also on the causal performance metric output by component 170), an administrator may efficiently determine to deploy, reject, re-train, or otherwise manage test model 130.

Figure 2:
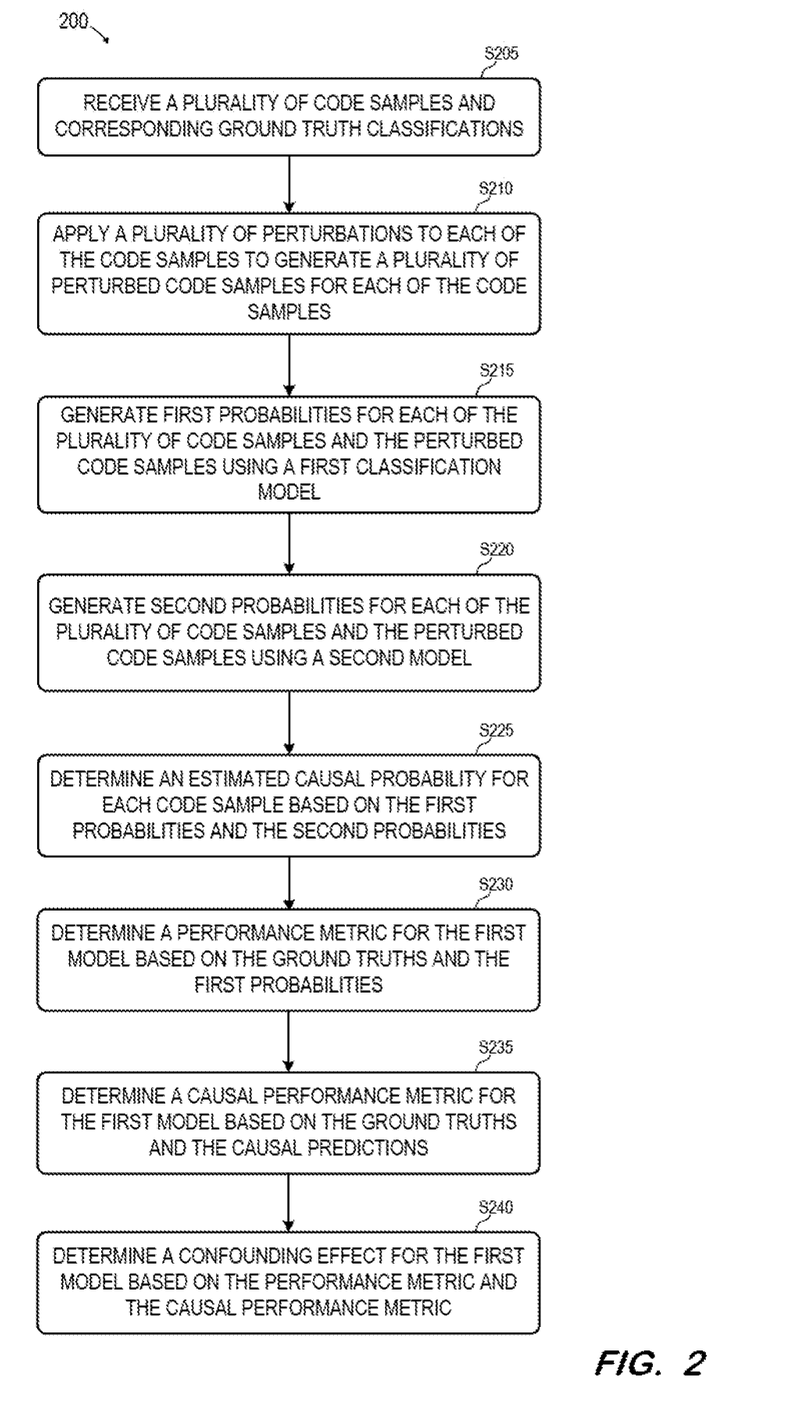
FIG. 2 comprises a flow diagram of a process to determine the estimated causal performance and confounding effect of a trained model according to some embodiments.

FIG. 2 comprises a flow diagram of process 200 to determine the estimated causal performance and confounding effect of a trained model according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, a plurality of code samples and corresponding ground truth classifications are received at S205. The code samples may conform to any programming language that is or becomes known, may be received from any number of sources and may describe any computing functionalities. Each ground truth classification may comprise a label indicating whether its corresponding code sample is Vulnerable or Clean.

At S210, a plurality of perturbations are applied to each of the code samples to generate a plurality of perturbed code samples for each of the code samples. Each perturbed code sample is intended to exhibit the same semantics as the code sample on which it is based, with respect to the programming language of the code sample. A perturbation may include a styling perturbation, in which style formatting is applied using clang-format with different predefined styles. Such styles may include, but are not limited to, Chromium, Google, LLVM, and Mozilla. Application of the style formatting is intended to remove style-related artifacts from the code samples.

An uglification perturbation may include removing comments, renaming all variables to a string of randomly-chosen lowercase letters (e.g., a twelve-letter string) and applying a style normalization. An uglification perturbation may also include removing all unneeded whitespace. These perturbations remove artifacts in code style and variable naming while also partially removing causal information, as the variable names are often chosen deliberately.

Perturbations at S210 may also consist of obfuscations including randomly renaming variables and functions, removing comments, adding unneeded statements, adding function definitions, and replacing numbers with an obfuscated equivalent number. The equivalent numbers are obtained by conversion to decimal, binary, octal, or hexadecimal and optionally adding the prefix zero. An obfuscation perturbation which randomly insert statements into the code may remove control-flow artifacts.

Figure 3:
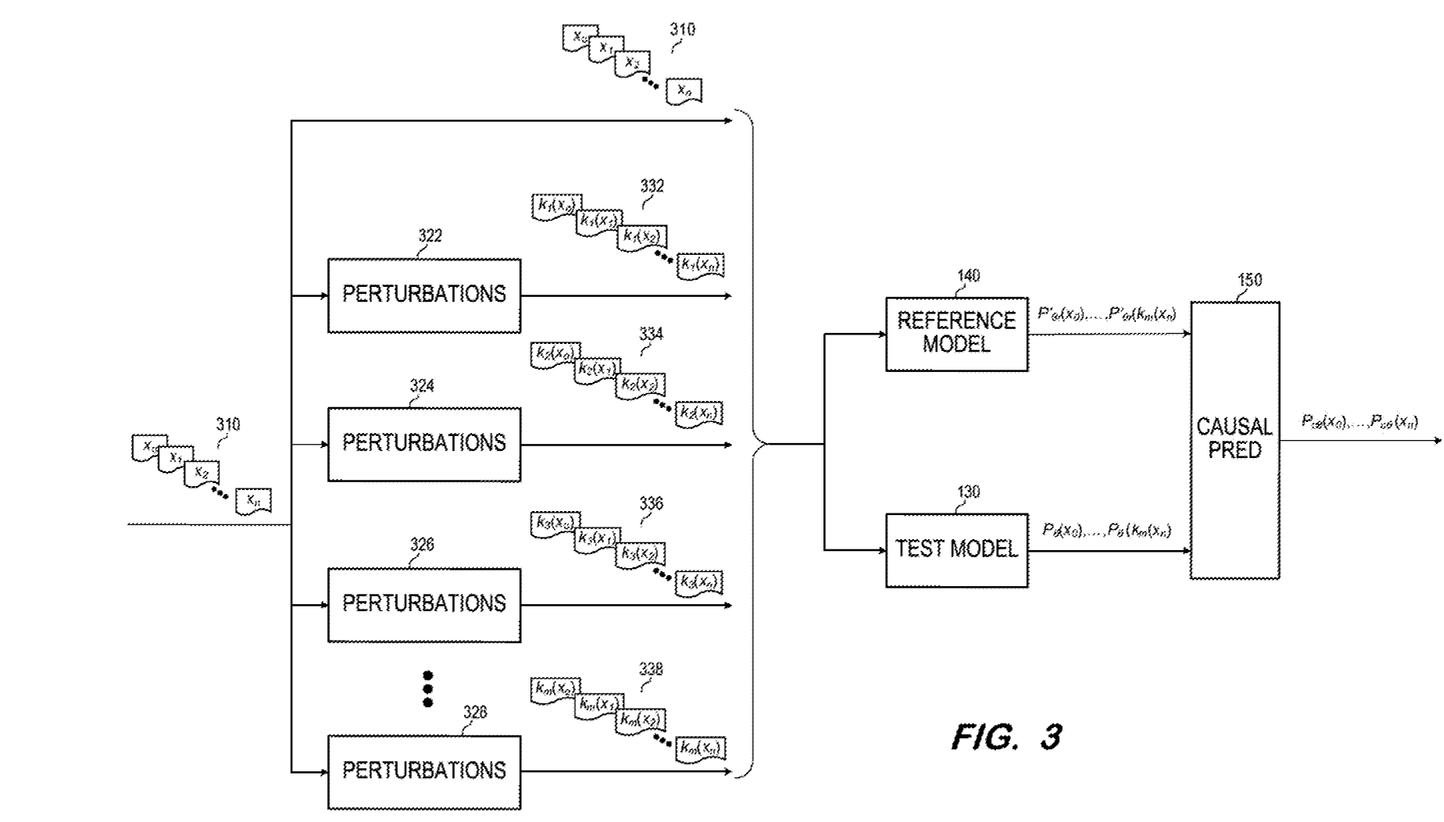
FIG. 3 illustrates determination of causal predictions according to some embodiments.

FIG. 3 illustrates S210 through S225 of process 200 according to some embodiments. Each of perturbations components 322 through 328 applies one or more perturbations to each of received code samples $X=(x_0, \ldots, x_n)$. A perturbation applied by one of perturbations components 322 through 328 may be applied by one or more other of perturbations components 322 through 328. A set of perturbations applied by one of perturbations components 322 through 328 is denoted as the function k, thus each of perturbations components 322 through 328 generates perturbed code samples 332, 334, 336 and 338 at S210.

First probabilities are generated for each of the plurality of code samples and the perturbed code samples using a first classification model at S215. FIG. 3 illustrates reception of code samples 310 and perturbed code samples 332, 334, 336 and 338 by test model 130. Test model 130 is a previously-trained classification as described above, and operates at S215 to output a likelihood that each received code sample is Vulnerable, i.e., $P_\theta(x_0), P_\theta(x_1), P_\theta(x_2), \ldots, P_\theta(x_n), P_\theta(k_1(x_0)), P_\theta(k_1(x_1)), P_\theta(k_1(x_2)), \ldots, P_\theta(k_1(x_n))$,
$P_\theta(k_2(x_0)), P_\theta(k_2(x_1)), P_\theta(k_2(x_2)), \ldots, P_\theta(k_2(x_n))$,
$P_\theta(k_3(x_0)), P_\theta(k_3(x_1)), P_\theta(k_3(x_2)), \ldots, P_\theta(k_3(x_n)), \ldots$,
$P_\theta(k_n(x_0)), P_\theta(k_n(x_1)), P_\theta(k_n(x_2)), \ldots, P_\theta(k_n(x_n))$.

A second probability for each code sample and perturbed code sample is generated by a second model at S220. The second probability may comprise a likelihood $P'_{\theta r}$ of each code sample (e.g., a likelihood that the tokens of the code sample would exist together in the order specified by the code sample) as determined using a probabilistic language model such as, for example, a generative Large Language Model with weights $\theta_r$. The second probability may be determined by calculating the likelihood of each token of a code sample dependent on the previous tokens, by averaging log-likelihoods over the entire code sample, or in any other manner.

As illustrated in FIG. 3, model 140 may operate at S220 to output a likelihood of each received code sample, i.e., $P'_{\theta r}(x_0), P'_{\theta r}(x_1), P'_{\theta r}(x_2), \ldots, P'_{\theta r}(x_n)$,
$P'_{\theta r}(k_1(x_0)), P_\theta(k_1(x_1)), P'_{\theta r}(k_1(x_2)), \ldots, P'_{\theta r}(k_1(x_n))$,
$P'_{\theta r}(k_2(x_0)), P'_{\theta r}(k_2(x_1)), P'_{\theta r}(k_2(x_2)), \ldots, P'_{\theta r}(k_2(x_n))$,
$P'_{\theta r}(k_3(x_0)), P'_{\theta r}(k_3(x_1)), P'_{\theta r}(k_3(x_2)), \ldots, P'_{\theta r}(k_3(x_n)), \ldots$,
$P'_{\theta r}(k_n(x_0)), P'_{\theta r}(k_n(x_1)), P'_{\theta r}(k_n(x_2)), \ldots, P'_{\theta r}(k_n(x_n))$.

At S225, an estimated causal probability is determined for each code sample based on the first probabilities and the second probabilities generated at S215 and S220. The estimated causal probability for a code sample may be determined using a weighted sum of the individual probabilities generated for the code sample and the perturbed code samples generated therefrom. For example, for each code sample x, the estimated causal probability $P_{c\theta}(x)$ may be calculated as follows (assuming three perturbation functions $k_1, k_2, k_3$):

$$P_{c\theta}(x) = \frac{\sum_x P_\theta(x) P'(x)}{\sum_x P'(x)} = \frac{P_\theta(x) P'(x) + P_\theta(k_1(x)) P'(k_1(x)) + P_\theta(k_2(x)) P'(k_2(x)) + P_\theta(k_3(x)) P'(k_3(x))}{P'(x) + P'(k_1(x)) + P'(k_2(x)) + P'(k_3(x))}$$

Accordingly, at S225, the following estimated causal probabilities may be determined:

$P_{c\theta}(x_0), P_{c\theta}(x_1), P_{c\theta}(x_2), \ldots, P_{c\theta}(x_n), P_{c\theta}(k_1(x_0)), P_{c\theta}(k_1(x_1)), P_{c\theta}(k_1(x_2)), \ldots, P_{c\theta}(k_1(x_n))$,
$P_{c\theta}(k_2(x_0)), P_{c\theta}(k_2(x_1)), P_{c\theta}(k_2(x_2)), \ldots, P_{c\theta}(k_2(x_n))$,
$P_{c\theta}(k_3(x_0)), P_{c\theta}(k_3(x_1)), P_{c\theta}(k_3(x_2)), \ldots, P_{c\theta}(k_3(x_n)), \ldots$,
$P_{c\theta}(k_n(x_0)), P_{c\theta}(k_n(x_1)), P_{c\theta}(k_n(x_2)), \ldots, P_{c\theta}(k_n(x_n))$.

A performance metric for the first model is determined at S230 based on the first probabilities $P_\theta$ and the ground truth classifications. The performance metric may comprise any model performance metric that is or becomes known. Determination of a performance metric for a classification model may include comparing classifications generated by the model based on test input data with ground truth classifications associated with the test input data.

Figure 4:
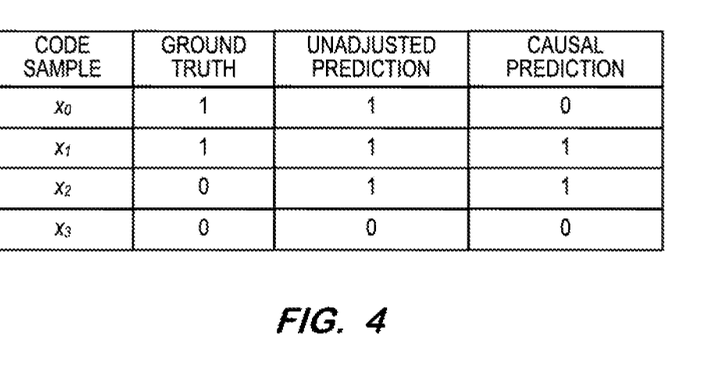
FIG. 4 illustrates, for each of a plurality of code samples, a ground truth, an unadjusted prediction and a causal prediction according to some embodiments.

FIG. 4 illustrates, for each of a plurality of code samples, a corresponding ground truth, an unadjusted prediction and a causal prediction according to some embodiments. The unadjusted prediction for a code sample is a classification predicted by the first model in response to input of the code sample. In the case of code sample $x_0$, the first model outputs a first probability $P_\theta(x_0)$ that the code sample $x_0$ is Vulnerable. S230 may include converting this first probability to a predicted classification. In some embodiments, the first probability is compared to a threshold (e.g., 0.5) and the classification is determined to be 1 (i.e., Vulnerable) if the first probability is greater than the threshold and 0 (i.e., Clean) if not.

For purposes of example, it will be assumed that the performance metric is balanced accuracy, and the ground truth classifications and unadjusted predictions are as shown in FIG. 4. Accordingly, given the ground truth classifications [1, 1, 0, 0] and the unadjusted predictions [1, 1, 1, 0], a balanced accuracy of 0.75=75% is determined for the first model at S230.

A causal performance metric for the first model is determined at S235 based on the ground truth classifications and the estimated causal probabilities determined at S225. To assist model evaluation, the causal performance metric should be the same performance metric determined at S230. The estimated causal probabilities may be first converted to classifications using the same threshold used at S230 as described above. FIG. 4 shows the causal probabilities for each of code samples $x_0$-$x_3$ after conversion to predicted classifications 1 and 0. Based on the ground truth classifications [1, 1, 0, 0] and the causal predictions [0, 1, 1, 0], a causal balanced accuracy of 0.50=50% is determined for the first model at S235.

In the present example of binary classification, a higher balanced accuracy reflects better performance than a lower balanced accuracy. Moreover, the balanced accuracy of a random guesser would be 50%. Accordingly, the determined causal balanced accuracy of the present example indicates to an administrator that the model under test is only as performant as a random guesser and therefore not suitable for deployment. The unadjusted balanced accuracy of 75%, on the other hand, does not provide that indication and may lead to inefficiencies.

A confounding effect for the first model is determined at S240 based on the performance metric and the causal performance metric. In some embodiments, the confounding effect c with respect to performance metric M is determined as:

$$c = \frac{(M_c - M_u)}{M_u},$$

where $M_u$ is the unadjusted performance metric determined at S230 and $M_c$ is the estimated causal performance metric determined at S240. Continuing the above example, c=(0.5−0.75)/0.75=−⅓≈−33%. This confounding effect indicates that 33% of the performance is lost after adjustment for confounding. Stated differently, 33% of the measured performance can be explained by effects caused by confounding variables rather than by mapping of causal features to model output.

Figure 5:
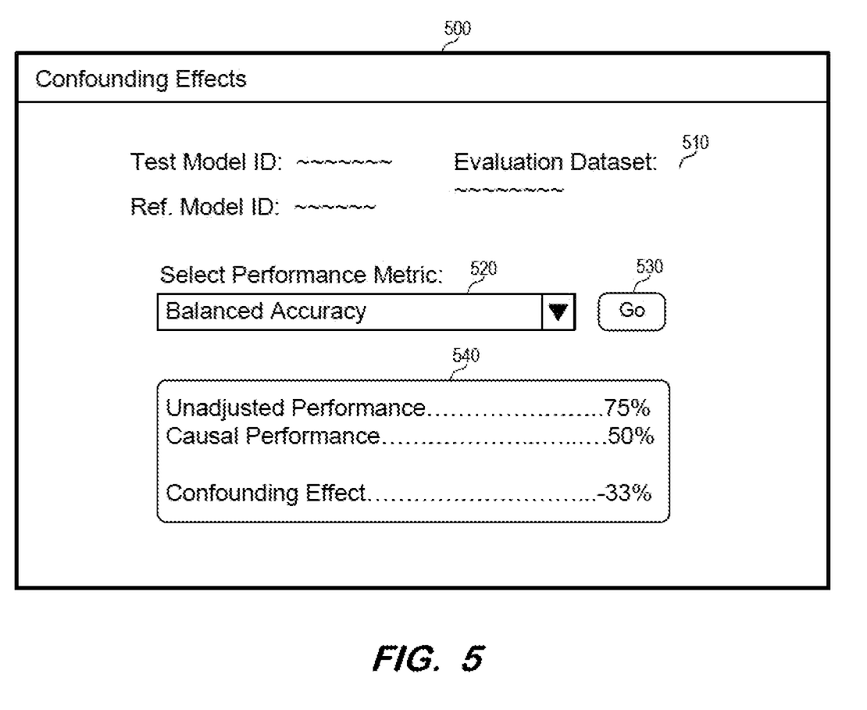
FIG. 5 is a user interface to request and present the estimated causal performance and confounding effect of a trained model according to some embodiments.

FIG. 5 illustrates user interface 500 to request and present the estimated causal performance and confounding effect of a trained model according to some embodiments. In one example, an administrator operates a Web browser to access a CI/CD application via a corresponding Uniform Resource Locator (URL) and the application returns an interface such as interface 500. According to some embodiments, interface 500 is presented by a device executing a client application (e.g., a Web application) which communicates with an application provided by a cloud-based system.

Interface 500 includes fields 510 identifying a model under test, a model providing code sample likelihoods (e.g., reference model 140), and an evaluation dataset comprising code samples and corresponding ground truth classifications. The administrator may manipulate drop-down menu 520 to select a performance metric with respect to which the confounding effects of the model under test should be determined, and control 530 may be selected to initiate a process such as but not limited to process 200.

Area 540 presents values determined by the initiated process. In particular, area 540 presents an unadjusted value of the performance metric as determined at S230, a value of the performance metric due to causal features as determined at S235, and a confounding effect of the model as determined at S240. The administrator may proceed to manage the model under test (e.g., delete, deploy, re-train) in view of the values presented in area 540.

Figure 6:
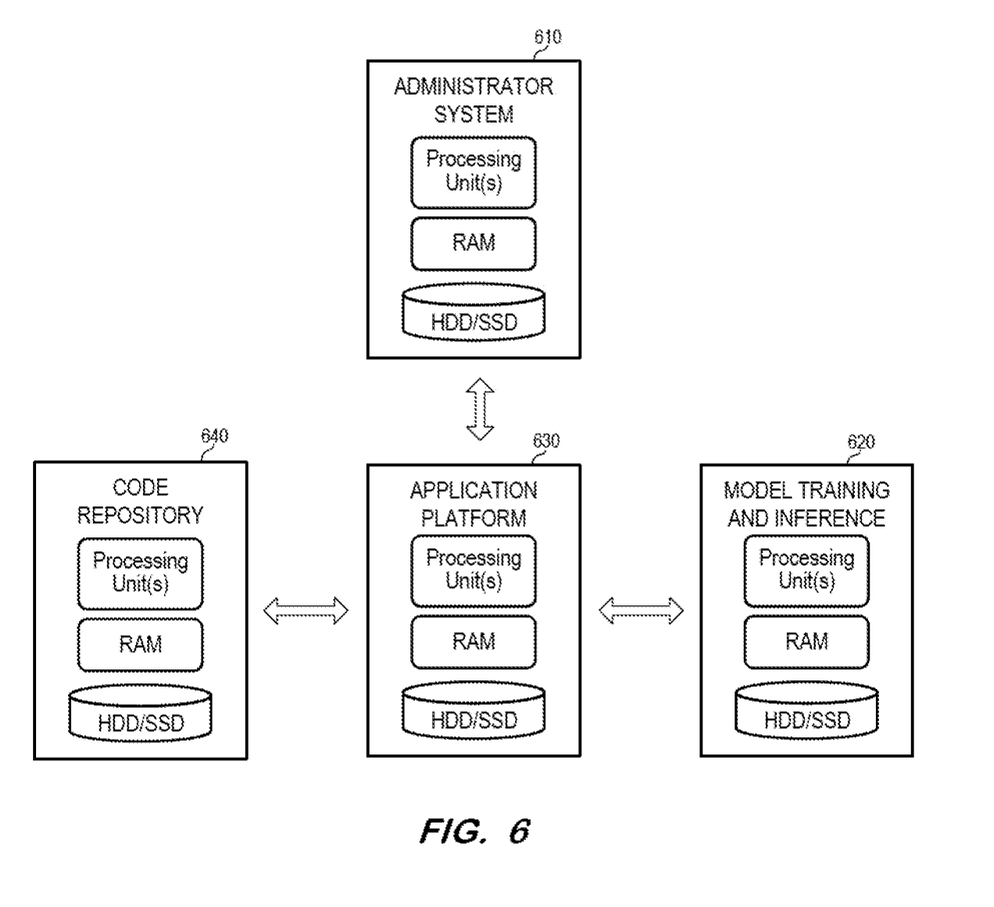
FIG. 6 is a diagram of a cloud-based implementation according to some embodiments.

FIG. 6 is a diagram of a cloud-based implementation according to some embodiments. Administrator system 610 may comprise a local computing system operated by an administrator to evaluate vulnerability discovery models trained by model training and inference system 620. The administrator may access an application executing on application platform 630 to identify a trained model of system 620 and code samples and corresponding ground truth classifications of code repository 640. The application may operate as described above to determine a causal performance and a confounding effect associated with the trained model, and to present these determinations to the administrator.

Each of systems 620, 630 and 640 may comprise cloud-based resources residing in one or more public clouds providing self-service and immediate provisioning, autoscaling, security, compliance, and identity management features. Systems 620, 630 and 640 may comprise servers or virtual machines of respective Kubernetes clusters, but embodiments are not limited thereto.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processing unit to execute the processor-executable program code to cause the system to:
receive a plurality of code samples and corresponding ground truth classifications;
for each of the plurality of code samples, generate a plurality of perturbed code samples;
generate first probabilities for each of the plurality of code samples and the perturbed code samples using a first classification model;
generate second probabilities for each of the plurality of code samples and the perturbed code samples using a second model;
determine a causal probability for each code sample based on the first probabilities and the second probabilities;
determine a causal performance metric of the first classification model based on the ground truth classifications and the causal probabilities; and
present the causal performance metric.

2. A system according to claim 1, the at least one processing unit to execute the processor-executable program code to cause the system to:
determine a performance metric of the first classification model based on the ground truth classifications and the first probabilities;
determine a confounding effect of the first classification model based on the performance metric and the causal performance metric; and
present the confounding effect.

3. A system according to claim 2, wherein determination of the confounding effect comprises determination of a difference between the performance metric and the causal performance metric.

4. A system according to claim 3, wherein generation of the second probabilities for each of the plurality of code samples and the perturbed code samples comprises:
determination of a likelihood of each of the plurality of code samples and the perturbed code samples using a probabilistic language model.

5. A system according to claim 1, wherein generation of the second probabilities for each of the plurality of code samples and the perturbed code samples comprises:
determination of a likelihood of each of the plurality of code samples and the perturbed code samples using a probabilistic language model.

6. A system according to claim 5, wherein each of the plurality of perturbed code samples generated for each of a given code sample is semantically-equivalent to the given code sample.

7. A system according to claim 1, wherein each of the plurality of perturbed code samples generated for each of a given code sample is semantically-equivalent to the given code sample.

8. A method comprising:
for each of a plurality of code samples, generating a plurality of perturbed code samples;
outputting first probabilities for each of the plurality of code samples and the perturbed code samples using a first classification model;
generating second probabilities for each of the plurality of code samples and the perturbed code samples using a second model;
determining a causal probability for each code sample based on the first probability output for the code sample and the second probabilities generated for the code sample and for the perturbed code samples generated for the code sample;
determining a causal performance metric of the first classification model based on the causal probabilities and on ground truth classifications corresponding to each of the plurality code samples; and
presenting the causal performance metric.

9. A method according to claim 8, further comprising:
determining a performance metric of the first classification model based on the ground truth classifications and the first probabilities;
determining a confounding effect of the first classification model based on the performance metric and the causal performance metric; and
presenting the confounding effect.

10. A method according to claim 9, wherein determining the confounding effect comprises determining a difference between the performance metric and the causal performance metric.

11. A method according to claim 10, wherein generating the second probabilities for each of the plurality of code samples and the perturbed code samples comprises:
determining a likelihood of each of the plurality of code samples and the perturbed code samples using a probabilistic language model.

12. A method according to claim 8, wherein generating the second probabilities for each of the plurality of code samples and the perturbed code samples comprises:
determining a likelihood of each of the plurality of code samples and the perturbed code samples using a probabilistic language model.

13. A method according to claim 12, wherein each of the plurality of perturbed code samples generated for each of a given code sample is semantically-equivalent to the given code sample.

14. A method according to claim 8, wherein each of the plurality of perturbed code samples generated for each of a given code sample is semantically-equivalent to the given code sample.

15. A non-transitory computer-readable recording medium storing processor-executable program code, the program code executable by a computing system to:
receive a plurality of code samples and corresponding ground truth classifications;
for each of the plurality of code samples, generate a plurality of perturbed code samples;
generate first probabilities for each of the plurality of code samples and the perturbed code samples using a first classification model;
generate second probabilities for each of the plurality of code samples and the perturbed code samples using a second model;
determine a causal probability for each code sample based on the first probabilities and the second probabilities;
determine a causal performance metric of the first classification model based on the ground truth classifications and the causal probabilities; and
present the causal performance metric.

16. A medium according to claim 15, the program code executable by a computing system to:
determine a performance metric of the first classification model based on the ground truth classifications and the first probabilities;

determine a confounding effect of the first classification model based on the performance metric and the causal performance metric; and present the confounding effect.

17. A medium according to claim 16, wherein determination of the confounding effect comprises determination of a difference between the performance metric and the causal performance metric.

18. A medium according to claim 17, wherein generation of the second probabilities for each of the plurality of code samples and the perturbed code samples comprises:
   determination of a likelihood of each of the plurality of code samples and the perturbed code samples using a probabilistic language model.

19. A medium according to claim 15, wherein generation of the second probabilities for each of the plurality of code samples and the perturbed code samples comprises:
   determination of a likelihood of each of the plurality of code samples and the perturbed code samples using a probabilistic language model.

20. A medium according to claim 19, wherein each of the plurality of perturbed code samples generated for each of a given code sample is semantically-equivalent to the given code sample.

* * * * *